United States Patent [19]
Nakayama

[11] 3,920,004
[45] Nov. 18, 1975

[54] DEVICE AND METHOD FOR NONINVASIVE MEASUREMENT OF BLOOD PRESSURE, RESISTANCE INERTANCE, COMPLIANCE, IMPEDANCE, BLOOD FLOW RATE, KINETIC ENERGY, FLOW VELOCITY AND PULSE VELOCITY OF A SEGMENT IN MAN

[76] Inventor: Ryu Nakayama, No. 2-2, 2-chome, Jiyugaoka, Meguro-ku, Tokyo, Japan

[22] Filed: Apr. 3, 1974

[21] Appl. No.: 457,508

[30] Foreign Application Priority Data
July 30, 1973 Japan.............................. 48-85745

[52] U.S. Cl.... 128/2.05 A; 128/2.05 F; 128/2.05 P; 128/2.05 V
[51] Int. Cl.² .......................................... A61B 5/02
[58] Field of Search...... 128/2.05 A, 2.05 E, 2.05 F, 128/2.05 G, 2.05 M, 2.05 P, 2.05 Q, 2.05 T, 2.05 V

[56] References Cited
UNITED STATES PATENTS

| 3,095,872 | 7/1963 | Tolles | 128/2.05 A |
| 3,224,435 | 12/1965 | Traite | 128/2.05 M |
| 3,482,565 | 12/1969 | Gowen | 128/2.05 A |
| 3,769,964 | 11/1973 | Smith | 128/2.05 G |

FOREIGN PATENTS OR APPLICATIONS

| 704,186 | 3/1941 | Germany | 128/2.05 P |
| 176,366 | 12/1965 | U.S.S.R. | 128/2.05 P |

*Primary Examiner*—William E. Kamm
*Attorney, Agent, or Firm*—Oblon, Fisher, Spivak, McClelland & Maier

[57] ABSTRACT

A device for noninvasively measuring various parameters characteristic of a blood circulation system within a human being includes a volume measuring device secured to a specific part of the human being for measuring changes in the blood flow volume therethrough, and a pressure measuring device, also secured to the specific part and spaced from the volume measuring device a pre-determined distance, for measuring the changes in pressure within the specific body part. Transducers convert the sensed volume and pressure values into electrical signals which are transmitted to suitable recording means whereby such recorded values, which are functions of time, may be utilized for determining the desired parameters.

8 Claims, 7 Drawing Figures

DEVICE AND METHOD FOR NONINVASIVE MEASUREMENT OF BLOOD PRESSURE, RESISTANCE INERTANCE, COMPLIANCE, IMPEDANCE, BLOOD FLOW RATE, KINETIC ENERGY, FLOW VELOCITY AND PULSE VELOCITY OF A SEGMENT IN MAN

BACKGROUND OF THE INVENTION

1. Field of the Invention

The present invention relates generally to a device for the noninvasive measurement of the change in the volume of blood passing through a specific part of the human being and the change in the pressure within the artery associated with the aforementioned part, and more particularly to a device for measuring the maximum and minimum blood pressures, vascular resistance, vascular compliance, inertance, impedance and blood flow rate of the precapillary and/or postcapillary.

2. Description of the Prior Art

Since the announcement of Kortkoff in 1905 of the method for measuring blood pressure without bleeding by employing a mercury manometer, such as for example, a manometer similar to that invented by S. Riva-Rocci, the method has been employed upon a worldwide basis. This method can be considered as a prominent method which, without causing pain or inconvenience to either the patient or the doctor, nevertheless furnishes clinically important information, and furthermore, such measuring device is quite easy to handle and is readily convenient. However, the mere measurement of only the blood pressure would not suffice to adequately indicate the dynamic blood circulation status of the system. This can readily be appreciated through a simple comparative analysis of an electric circuit.

For example, even if the voltage difference across a specific portion of the electric circuit can be measured, such does not render the status of the electric circuit. Information concerning the electric current, resistance, inductance, capacitance and frequency of the alternating current would definitely be necessary. Similarly, in analyzing the hemodynamic status of the peripheral circularory system, information concerning the blood flow rate, vascular resistance, vascular compliance, inertance, and impedance would be required.

Continuing further, one important drawback characteristic of conventional methods is that in order to obtain such information, various operations must be performed whereby the skin and blood vessels are necessarily pierced, the blood vessels are exposed to the atmosphere as a result of the piercing of the same as well as the skin, and/or catheters are inserted into the vessels. Such operations are not easy to perform and can be quite uncomfortable for both the patient and the doctor. Moreover, these operations are not especially suited to those cases wherein repeated examinations are required, or where the examination must be carried out in the process of motive loading.

SUMMARY OF THE INVENTION

Accordingly, it is an object of the present invention to provide a device which can furnish the necessary information for the analysis of the dynamic blood circulation status precisely and repeatedly, and wherein the patient is not subjected to any pain nor is penetration of the skin necessary.

The foregoing and other objects are achieved according to the present invention through the provision of a device which includes two component parts having different functions, one of which is a volume measuring device which can measure the volume change within a particular part of the system which can be most easily measured, and the other is a blood pressure measuring device which is installed within the proximity of the volume measuring device and which serves to pressurize the artery upon the heart side relative to the volume device and to measure the pressure change within such artery. Within this invention, the term artery includes all arteries ranging from true capillary, which Zweifach defines, to arterial side.

The volume measuring device is preferably one which can measure directly the volume change within the specific part of the system, and it may also be one which can measure indirectly the volume change within the associated artery which thus causes a change in the volume of blood flowing therethrough, or a change in the amount of hemoglobin within the artery, or the change in the electrical impedance which varies in response to such changes. Any parameter which can correctly indicate the change in the blood volume of the artery can be used.

When volume change is expressed as $\Delta v_t$, the following equation indicates the fundamental principal of this invention:

$$\Delta v_t = K V \bar{U}_t/c$$

wherein $K$ represents a proportional constant, $V$ represents the undisturbed volume of the blood vessel within the system part under observation, $\bar{U}_t$ represents the average flow velocity at a time $t$, and $c$ represents the pulse wave velocity. In other words, the volume change can be expressed as a function of the mean blood flow velocity within the particular system part. When blood flow ceases, $\Delta V$ will of course be zero, and when blood flow exists, $\bar{U}_t$ is not zero and accordingly $\Delta V_t$ shall not be zero. The volume measuring device noted above thus represents a significant system component in light of the fundamental equation governing the system.

The blood pressure measuring device, which serves to compress the artery and measure the change in blood pressure exhibited thereby, has the capability that the vessel can be compressed from a position external of the patient's body and to a desired pressure, and at the same time can accurately record the pressure responses from the blood vessel. In other words, the primary capability of the blood pressure measuring device is to apply the desired static pressure and the secondary capability of such device is to measure the dynamic pressure change and accurately record the pressure pulse wave form.

Furthermore, additional new information can be obtained by properly combining the above-mentioned volume and blood pressure measuring devices. The proper combination does not necessarily involve the simplest mode whereby a single volume measuring device and a single blood pressure measuring device is utilized, but to the contrary, the proper combination of single and/or plural volume measuring devices and single and/or plural blood pressure measuring devices, suitably arranged in any order with each other may be warranted depending upon the intended purposes.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
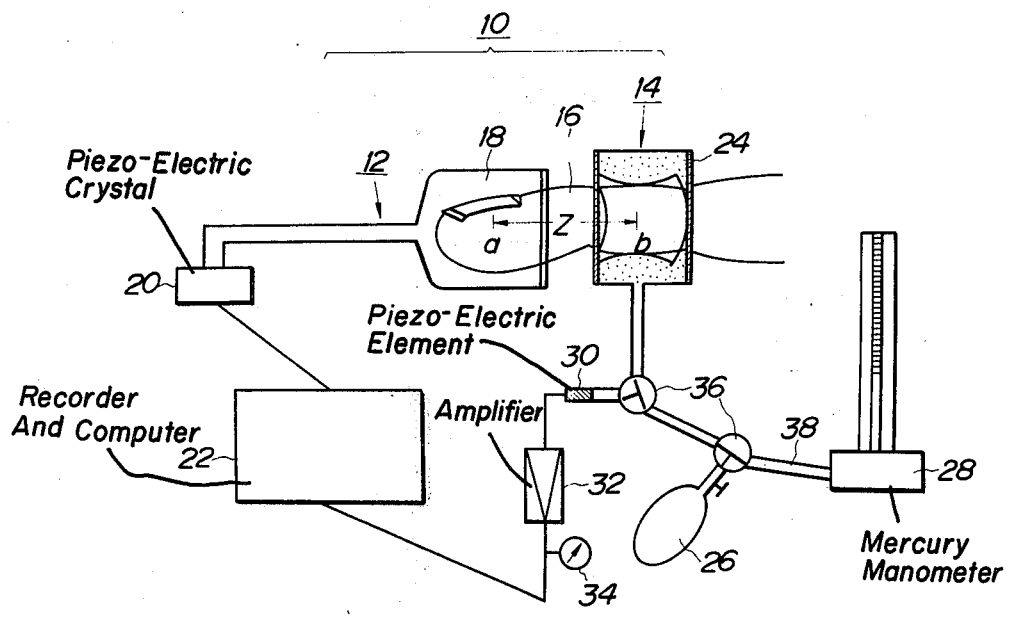
FIG. 1 is a schematic view of a device constructed according to the present invention and showing its cooperative parts.

Referring now to the drawings, and more particularly to FIG. 1 thereof, one embodiment of the present invention is disclosed in which the device of the invention, generally indicated by the reference character 10 includes a volume measuring device generally indicated by the reference character 12 and a blood pressure measuring device generally indicated by the reference character 14. The volume measuring device 12 is installed at a specific part of the system at which the volume change can easily be measured such as for example, upon a finger-tip 16, the middle of which is denoted as $a$, and the blood pressure measuring device 14 is similarly installed at another part $b$ of the finger, the middle point of which is spaced apart from the point $a$ by a distance Z which may be for example, greater than 22 mm. The volume measuring device 12 includes a capsule 18 which is sealingly installed upon finger tip 16 so as to measure the change in volume of the blood passing through it and a piezo-electric crystal 20 which converts the volume change imparted to capsule 18 into an electrical signal, such output signal being transmitted to a recorder and/or a computer, the recorder and computer being generally indicated by reference character 22.

The blood pressure measuring device 14 includes a cuff 24 adapted to compress the finger portion b and alter the pressure change therewithin, a squeezable bulb 26 for applying air pressure to the cuff 24, a mercury manometer 28 fluidically connected to bulb 26 so as to measure the pressure inside cuff 24, and a piezo-electric element 30, such as for example, a semiconductor, which is adapted to convert the internal pressure parameter pressure an electrical signal, suitable three-way cocks 36 and air conduits 38 being interposed between bulb 26 and manometer 28 and cuff 24.

The output signal of piezo-electric element 30 is in turn transmitted to recorder 22 through means of an amplifier 32, and such signal is simultaneously recorded along with the signal indicative of the volume change of blood within the finger tip, as indicated by the capsule 18, further processing of the results then being able to be performed. In order to monitor the output signals, a voltage meter 34 may be connected to the amplifier 32.

Figure 2:
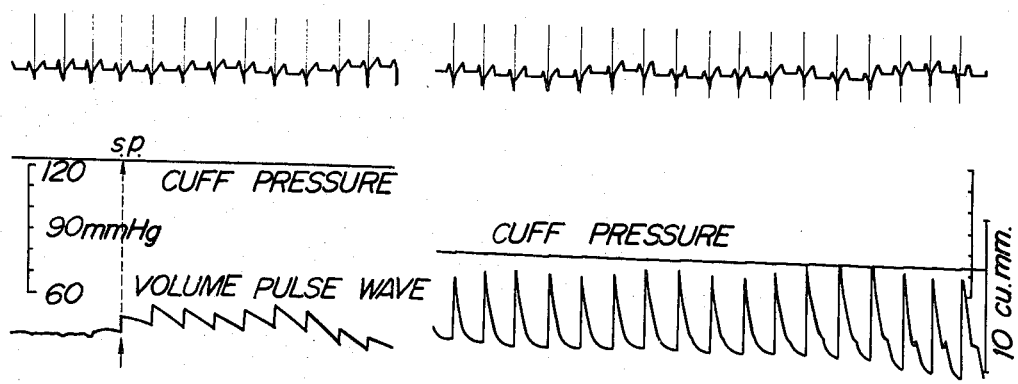
FIG. 2 is a recording of the cuff pressure and volume changes associated with a specific part of a human being, such as for example, a finger tip.
Figure 2:
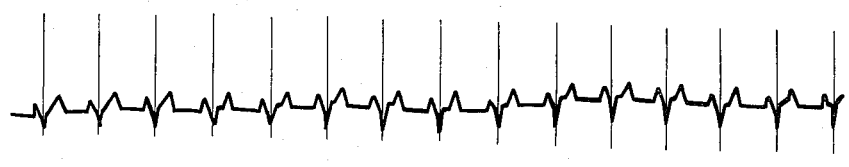
Figure 2:
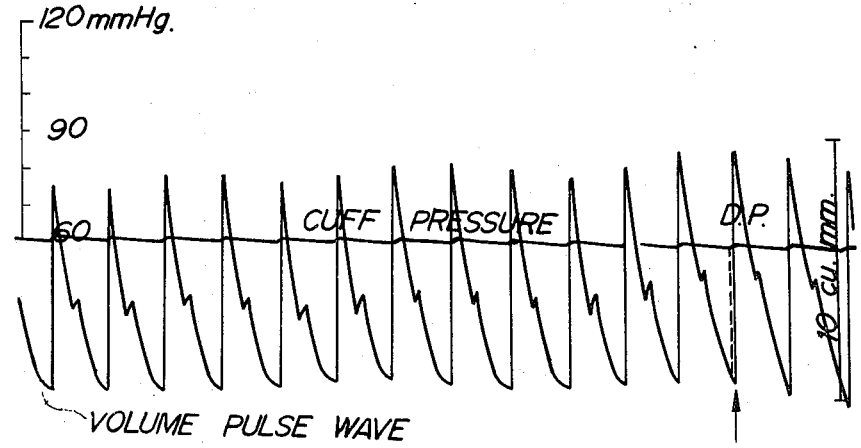

It is generally considered that the pulse wave amplitude is proportional to the product of the undisturbed volume of the regional vascular beds and the mean flow velocity within the vessels and is inversely proportional to the pulse wave velocity. When a vessel is strongly compressed by means external of the body, blood flow is terminated and the flow velocity naturally becomes zero. Therefore, as seen at the left side of FIG. 2, the volume pulse wave does not appear, and this is the state wherein the cuff pressure exceeds the systolic pressure level. The pressure within the cuff is continuously measured by means of the piezo-electric element 30 and also by means of the mercury manometer 28, and when the cuff pressure is gradually lowered, the pulse wave will suddenly appear at a point wherein the cuff pressure is denoted as S.P. as seen in FIG. 2, that is, the pressure within the vessel is equal to or slightly greater than the outside cuff pressure whereupon blood flow commences. In other words, the cuff pressure at this point in time can be considered equal to the external pressure compressing the digital vessel, and may be regarded as the systolic pressure, that is, the highest pressure value of the pressure cycle within the vessel.

When the cuff pressure is decreased further, the digital pulse wave form will be variably changed as shown in FIG. 2, but will shortly attain a stable stage within which the amplitude of the pulse wave, including the height of the dicrotic notch, becomes gradually greater and in addition, the contour of the wave is also gradually changed toward the control form. At this particular stage, the amplitude ($\Delta v$) of the volume pulse wave is proportional to the radial pressure difference ($\Delta p$), that is, s.p. -cuff pressure at the particular moment, and the ratio of $\Delta v$ to $\Delta p$, which might be denoted precapillary compliance ($C_{pre.}$), can be obtained by the procedure.

Figure 3:
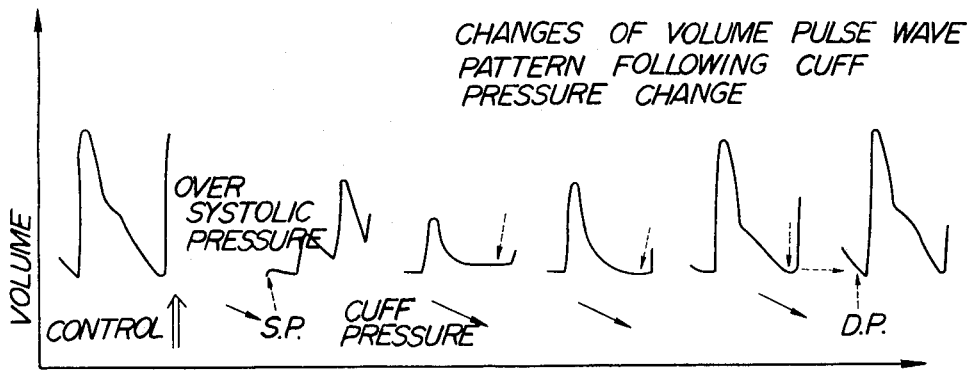
FIG. 3 is a diagrammatic view showing the characteristics of the volume pulse wave form as the same varies with the changes in the cuff pressure.
Figure 4:
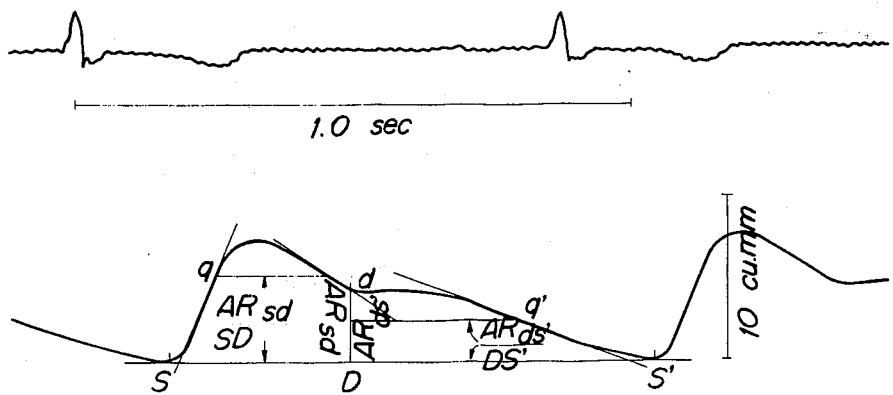
FIG. 4 is an illustrative view indicating how the volume pulse wave is measured whereby various information may be obtained from such wave for further calculating other parameters of interest.

When the cuff pressure exceeds the diastolic pressure, the vessel will be somewhat occluded at a certain point during the diastolic period whereupon the blood flow velocity within the vessel must of necessity become extremely retarded, and therefore, the amplitude of the pulse wave after the moment of occlusion will be lost. Consequently, the last part of the pulse wave during the distolic period will become part of the base line. As the cuff pressure is lowered, the characteristics of the pulse wave form mentioned above gradually becomes lost as seen in FIG. 3, and when the cuff pressure reaches a predetermined level, the characteristics of the wave form completely disappear at which time the lowest pressure within the vessel exceeds the outside pressure. The cuff pressure at such time might thus be regarded as the diastolic pressure (D.P.). By the procedures mentioned above therefore, the systolic pressure (S.P.) and the diastolic pressure (D.P.) within the digital vessel can be obtained, but it is to be noted that these operations must be completed with a short period of time so as to minimize the influence of venous congestion.

By utilizing the various parameters $C_{pre.}$, SD interval, DS' interval systolic pressure (S.P.), diastolic pressure (D.P.). precapillary/postcapillary resistance ratio K/K', the precapillary resistance index K/L, the postcapillary resistance index K'/L', and the precapillary/postcapillary pressure ratio P/P', invaluable information concerning hemodynamics can be obtained as follows:

1. Precapillary resistance ($R_{sd}$)

The precapillary resistance is obtained from the equation:

$$R_{sd} = SD/C_{pre.} \quad (1)$$

wherein SD represents the time interval between the starting point of the pulse wave S and the dicrotic notch D, and $C_{pre.}$ represents the precapillary compliance already obtained.

2. Postcapillary resistance ($R_{ds'}$)

The postcapillary resistance is obtained from the combination of Equation (1) and the precapillary/postcapillary resistance ratio K/K' as follows:

$$R_{ds'} = R_{sd} \times K'/K \quad (2)$$

(3) Precapillary inertance ($L_{sd}$)

The precapillary inertance is obtained from the combination of Equation (1) and the precapillary resistance index K/L as follows:

$$L_{sd} = R_{sd} \times L/K \quad (3)$$

4. Postcapillary inertance ($L_{ds'}$)

The postcapillary inertance is obtained from the combination of Equation (2) and the postcapillary resistance index K'/L' as follows:

$$L_{ds'} = R_{ds'} \times L'/K' \quad (4)$$

5. Postcapillary compliance ($C_{post.}$)

The postcapillary compliance is obtained from the combination of Equation (2) and the DS' interval as follows:

$$C_{post.} = DS'/R_{ds'} \quad (5)$$

6. Mean arterial pressure ($P_a$)

The mean arterial pressure can be calculated from the systolic pressure (S.P.) and diastolic pressure (D.P.) as follows:

$$P_a = (S.P. + 2\, D.P.)/3 \quad (6)$$

7. Capillary pressure ($P_{cap.}$)

The capillary pressure can be calculated from the equation proposed by Pappenheimer and Soto-Rivera as follows:

$$P_{cap.} = \frac{P_a \frac{K'}{K} + P_v}{1 + \frac{K'}{K}} \quad (7)$$

8. Venous pressure ($P_v$)

The venous pressure can be calculated from Equation (6) and the precapillary/postcapillary pressure ratio (P/P') as follows:

$$P_v = P_a \times P'/P \quad (8)$$

9. Flow rate during the SD interval (equal to the flow rate during the DS' interval)

$$F = (P_a - P_{cap.})/R_{sd} \quad (9)$$

10. Precapillary impedance ($|Z|$)

The precapillary impedance can be calculated from the parameters $C_{pre.}$, $R_{sd}$, $L_{sd}$ and $\omega$ (pulse frequency), the absolute value of which is obtained as follows:

$$|Z| = R_{sd}\left\{1 + R_{sd}^2 \left(\frac{1}{\omega L_{sd}} - \omega C_{pre.}^2\right)^2\right\}^{-\frac{1}{2}} \quad (10)$$

11. Postcapillary impedance ($|Z|'$)

The postcapillary impedance can be calculated from the parameters $C_{post.}$, $R_{ds'}$, $L_{ds'}$ and $\omega$ (pulse frequency), the absolute value of which is obtained as follows:

$$|Z|' = R_{ds'}\left\{1 + R_{ds'}^2 \left(\frac{1}{\omega L_{ds'}} - \omega C_{post.}^2\right)^2\right\}^{-\frac{1}{2}} \quad (11)$$

12. Precapillary kinetic energy ($K.E._{pre.}$)

The precapillary kinetic energy is obtained from the flow rate and inertance as follows:

$$K.E._{pre.} = \frac{1}{2} F_{sd}^2 L_{sd} \quad (12)$$

13. Postcapillary kinetic energy ($K.E._{post.}$)

The postcapillary kinetic energy is obtained from the flow rate and inertance as follows:

$$K.E._{post.} = \frac{1}{2} F_{ds'}^2 L_{ds'} \quad (13)$$

however, the flow rate during the interval SD is regarded as equal to that during the interval DS'.

Similarly, the method of deriving several components from the volume pulse wave, and the accompanying abbreviation of glossaries, will now be explained. The parameter $AR_{sd}$ represents the area under the pulse wave over the interval SD. A line parallel to the base line, and which is a distance $AR_{sd}/SD$ apart therefrom, can be drawn, the intersection of such line with the ascending limb being denoted q. Similarly, the parameter $AR_{ds'}$ represents the area under the pulse wave over the interval DS'. A line parallel to the base line, and which is a distance $AR_{ds'}/DS'$ apart therefrom, can be drawn, the intersection of which with the ascending limb is denoted q'. The rate of slope of the pulse wave at the point q is given by the expression $$(d\,\Delta v/dt)_q$$

and the rate of slope of the pulse wave at the point q' is likewise given by the expression $$-|d\,\Delta v/dt|_{q'},$$

the negative sign of the value $(d\,\Delta v/dt)_{q'}$ merely signifying the decrease in volume. Several indices and ratios can then be calculated by suitable combination of the aforenoted parameters as follows:

A. Precapillary resistance index (K/L)

$$\frac{K}{L} = \frac{(d\Delta v/dt)_q}{AR_{sd}/SD}$$

B. Postcapillary resistance index (K'/L')

$$\frac{K'}{L'} = \frac{|d\Delta v/dt|_{q'}}{AR_{ds'}/DS'}$$

C. Precapillary/postcapillary resistance ratio (K/K')

From the precapillary resistance index (K/L) and the postcapillary resistance index (K'/L'), we may derive:

$$\frac{KL'}{LK'} = \frac{(d\Delta v/dt)_q (AR_{ds'}/DS')}{|d\Delta v/dt|_{q'} (AR_{sd}/SD)}$$

As the precapillary/postcapillary inertance ratio is given by $$\frac{L}{L'} = \frac{(AR_{sd}/SD)^2}{(AR_{ds'}/DS')^2},$$

the precapillary/postcapillary resistance ratio can be obtained from these two values, and consequently:

$$\frac{K}{K'} = \frac{(d\Delta v/dt)_q (AR_{sd}/SD)}{|d\Delta v/dt|_{q'} (AR_{ds'}/DS')}$$

D. Precapillary/postcapillary pressure ratio (P/P')

The precapillary/postcapillary pressure ratio can be obtained in a manner similar to that of the precapillary/postcapillary resistance ratio as follows:

$$\frac{P}{P'} = \frac{(d\Delta v/dt)_q \ (AR_{sd}/SD)}{|d\Delta v/dt|_{q'} \ (AR_{ds'} \ /DS')}$$

E. Capillary pressure ($P_{cap.}$)

The capillary pressure can be derived from the equation formulated by Pappenheimer and Soto-Rivera, the precapillary/postcapillary resistance ratio and the precapillary/postcapillary pressure ratio, whereby:

$$P_{cap.} = \frac{2 P_a \cdot \frac{|d\Delta v/dt|_{q'}}{(d\Delta v/dt)_q} \cdot \frac{(AR_{ds'} \ /DS)}{(AR_{sd}/SD)}}{1 + \frac{|d\Delta v/dt|_{q'}}{(d\Delta v/dt)_q} \cdot \frac{(AR_{ds'} \ /DS')}{(AR_{sd}/SD)}}$$

F. Pulse wave velocity (c)

The pulse wave velocity can be measured by utilizing the capsule 18 and the cuff 24 when the same are arranged as shown in FIG. 1. The change in the cuff-pressure can be recorded upon the recorder 22 through means of the piezo-electric element 30. This pressure wave within the cuff, as well as the volume pulse wave within the capsule 18 are recorded simultaneously and the time difference $\Delta t$ between commencement of both types of waves may be obtained. The feeding speed of the recording is 1000 mm/sec., and since the distance Z (cm) between a and b in FIG. 1 is known, the pulse wave velocity (c) can be calculated from $\Delta t$ and Z as follows:

$$C = Z/\Delta t \ (cm/sec.)$$

G. Average flow velocity ($\bar{U}$)

As the mean arterial pressure ($P_a$), capillary pressure ($P_{cap.}$), and pulse wave velocity (c) have already been derived, the average flow velocity U may be calculated by Allievi's equation:

$$\bar{U} = \frac{P_a - P_{cap.}}{p \ c}$$

wherein p represents the blood density.

H. Undisturbed vessel volume (V)

As the volume change ($\Delta v$), pulse wave velocity (c) and average flow velocity ($\bar{U}$) are known, and although we cannot derive the constant (K) which is dependent upon the properties of the vessel walls and the surrounding tissues, the value of such parameter is assumed to be one depending on the particular application and usually has a value somewhere between 2 and 3. The undisturbed vessel value is then seen to be:

$$V = \frac{\Delta v \ c}{K \ \bar{U}}$$

Figure 5:
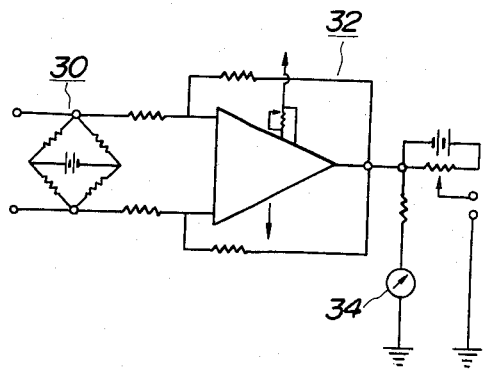
FIG. 5 is an electrical circuit block diagram of the pressure measuring device shown in FIG. 1.
Figure 6:
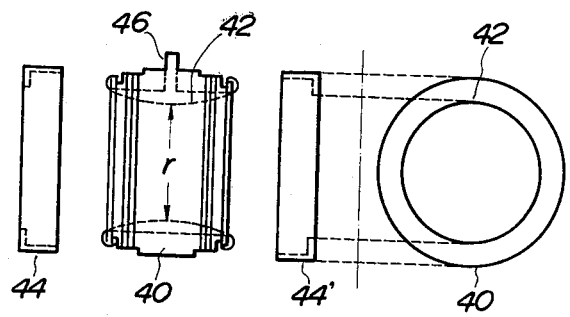
FIG. 6 is a schematic partly sectional, exploded view of the cuff device shown in FIG. 1.
Figure 7:
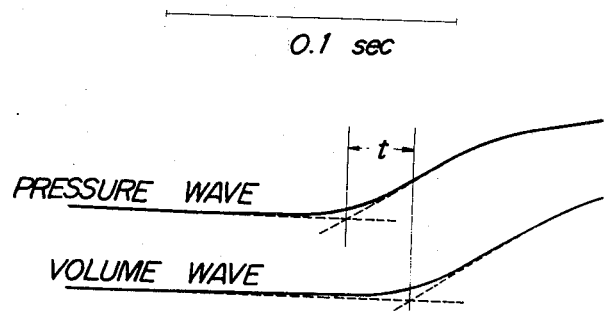
FIG. 7 is a diagrammatic view for determining the time difference between the onset of the ascending limb of the pressure wave and that of the volume wave whereby the pulse velocity may be calculated therefrom.

Referring now to FIG. 5, there is shown an electrical circuit characteristic of the pressure measuring device schematically illustrated in FIG. 1 and including the piezo-electric element 30, amplifier 32 and voltage meter 34. The pressure cuff 24 is similarly disclosed within FIG. 6 as including an air-tight metal cover 40 and an annular inflatable rubber bag 42 covering the entire interior cylindrical wall thereof. The rubber bag is not always necessary, such serving to retain air pressure within the cuff without leakage, and consequently, if air leakage through the joints is prevented by some other means, the rubber bag may be dispensed with. In order to insure the integrity between metal cover 40 and rubber bag 42, supporting frames 44 and 44' are threadedly secured to both sides of the metal cover. The digit which is to be inserted through the defined aperture within cuff 24 may then be compressed by suitably applying pressure through means of guide pipe 46. The invention should be further systemized by utilizing an A-D converter and a digital computer in order to obtain information from the two kinds of devices whereby calculation of the various parameters may be accomplished.

The first step in utilizing the disclosed system is to recognize the control pattern of the volume pulse wave and whether or not the same is smooth and stable. When the cuff pressure becomes greater than the systolic pressure level, the volume pulse wave can no longer be recognized, and the pressure level within the cuff and the output level from the volume measuring device, which is normally constant and does not generate a signal with high frequency, should be simultaneously noted. This is the second step.

As the cuff pressure is decreased to a predetermined level, the computer should recognize the sudden increase in the volume output and the pressure level within the cuff at the particular time, and such pressure level should be programmed into the memory core of the computer as the systolic pressure (S.P.). This is the third step. Within a few seconds, the base level, that is the S—S' level, and the contour of the pulse wave will fluctuate substantially, and subsequently, such parameters stabilize, the computer recognizing whether or not such base level and contour of the pulse wave do in fact fluctuate. This is the fourth step.

As the pressure difference ($\Delta p$) between the cuff pressure and the systolic pressure becomes larger, the amplitude ($\Delta v$) of the volume pulse wave also becomes greater and the computer should be able to recognize the pressure difference and the corresponding amplitude of the volume pulse wave, and immediately calculate the compliance ($C_{pre.}$) therefrom. This is the fifth step. As the pressure level within the cuff decreases, the contour of the pulse wave is gradually changed, the computer recognizing when the descending limb of the pulse wave becomes linear and should also recognize the pressure level at this particular time so as to record the same as the diastolic pressure (D.P.). This is the sixth step.

Immediately subsequent to the time when the diastolic pressure is recognized, the time difference between the onset of the pressure pulse and that of the volume pulse wave should be measured and the pulse velocity should be calculated by the computer from such time difference and the distance Z. This is the seventh step. When the cuff pressure becomes zero, the control pulse wave can once again be obtained. The A-D converter and the computer should recognize $\Delta v$, the S point, the D point, the S' point, the SD interval and the DS' interval, and should be able to calculate the parameters $AR_{sd}$, $AR_{ds'}$, $AR_{sd}/SD$, $AR_{ds'}/DS'$, $(d \Delta v/dt)_q$ and $|d \Delta v/dt|_{q'}$. This is the eighth step. All such parameters and information can be obtained by the pressure device, the volume device and the computer system.

The next step should be the calculation of the characteristic values of the peripheral blood flow which were already indicated from such data by means of the computer. This is the ninth step. The computed values will be digitally displayed or may be displayed in written form by means of a typewriter associated with the computer. This is the tenth step. The system, for the present invention should thus comprise a pressure device, a volume device, and a two channel A-D converter connected with the two channels of a digital computer and a reader or typewriter.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the U.S. is:

1. A device for the noninvasive measurement of blood pressure, compliance, resistance, inertance, impedance, blood flow rate, blood flow velocity, blood flow kinetic energy and pulse wave velocity parameters within a specific part of a human being comprising:
   volume measuring means adapted to be secured to said specific part of said human being for measuring changes in the blood flow volume within said specific part of said human being and for generating a first set of signals in response to said changes in said blood flow volume;
   pressure measuring means adapted to be secured to said specific part of said human being and separated from said volume measuring means a predetermined distance for measuring changes in pressure within said specific part of said human being and for generating a second set of signals in response to said changes in said pressure;
   means for simultaneously recording said first and second set of generated signals as functions of time; and
   means for determining blood pressure, compliance, resistance, inertance, impedance, blood flow rate, flood flow velocity, blood flow kinetic energy and pulse wave velocity from said recorded first and second set of generated signals.

2. A device as set forth in claim 1 wherein said volume measuring means comprises:
   a capsule adapted to be secured to said specific part of said human being in an air-tight manner so as to accurately sense said volume changes within said part; and
   a piezo-electric crystal transducer associated with said capsule for converting said sensed volume changes to said first set of signals.

3. A device as set forth in claim 1 wherein said pressure measuring means comprises:
   a cuff adapted to be secured to said specific part of said human being in an air-tight manner so as to accurately sense said pressure changes within said measuring device; and
   a piezo-electric crystal transducer associated with said cuff for converting said sensed pressure changes to said second set of signals.

4. A device as set forth in claim 1 wherein said means for simultaneously recording said first and second sets of signals comprises a digital computer.

5. A method of noninvasively measuring blood pressure, compliance, resistance, inertance, impedance, blood flow rate, blood flow velocity, blood flow kinetic energy, and pulse wave velocity parameters with a specific part of a human being comprising:
   securing pressure measuring means and volume measuring means to said specific part of said human being;
   pressurizing said pressure measuring means to generate a first set of signals as a function of time indicative of the changes of blood flow volume within said specific part of said human being and a second set of signals as a function of time indicative of the changes of pressure within said specific part of said human being, said first set of signals comprising a volume pulse wave;
   simultaneously recording said first and second set of signals as functions of time; and
   determining blood pressure, compliance, resistance, inertance, impedance, blood flow rate, blood flow velocity, blood flow kinetic energy and pulse wave velocity from said recorded first and second set of signals.

6. A method as set forth in claim 5 further comprising the steps of:
   recording the amplitude of said volume pulse wave; and
   recording the radial pressure difference corresponding to said amplitude of said volume pulse wave so that said precapillary compliance may be determined.

7. A method as set forth in claim 5 further comprising the steps of:
   securing said pressure measuring means to said part of said human being at a point located a predetermined distance from said volume measuring means; and
   recording the time difference between the onset of the pressure and volume pulse waves as a result of said pressurization of said pressure measuring means so that said pulse velocity may be determined.

8. A method as set forth in claim 5 further comprising the steps of:
   recording the particular pressure signal of said second set of signals which correspond to the systolic pressure; and
   recording the particular pressure signal of said second set of signals which correspond to the diastolic pressure so that the arterial pressure within said part of said human being may be determined.

* * * * *